ROLLER FLYWEIGHT GOVERNOR

Filed Dec. 28, 1954 6 Sheets-Sheet 1

INVENTOR
JARVIS S. JENNINGS
BY
Cushman Darby & Cushman
ATTORNEYS

March 1, 1960 J. S. JENNINGS 2,926,901

ROLLER FLYWEIGHT GOVERNOR

Filed Dec. 28, 1954 6 Sheets-Sheet 2

INVENTOR

JARVIS S. JENNINGS

BY

Cushman Darby Cushman

ATTORNEYS

ROLLER FLYWEIGHT GOVERNOR

Filed Dec. 28, 1954 6 Sheets-Sheet 3

INVENTOR

JARVIS S. JENNINGS

BY

ATTORNEYS

March 1, 1960 J. S. JENNINGS 2,926,901

ROLLER FLYWEIGHT GOVERNOR

Filed Dec. 28, 1954 6 Sheets-Sheet 4

INVENTOR

JARVIS S. JENNINGS

BY [signature]

ATTORNEYS

INVENTOR
JARVIS S. JENNINGS

BY Cushman, Darby & Cushman
ATTORNEYS

INVENTOR
JARVIS S. JENNINGS
BY Cushman, Darby & Cushman
ATTORNEY

United States Patent Office 2,926,901

Patented Mar. 1, 1960

2,926,901

ROLLER FLYWEIGHT GOVERNOR

Jarvis S. Jennings, Chicago, Ill., assignor to Hoof Products Company, Chicago, Ill., a corporation of Illinois Application December 28, 1954, Serial No. 478,133

7 Claims. (Cl. 264—17)

The present invention relates to governors and more particularly, to an improved variable speed centrifugal governor for internal combustion engines and the like.

An important object is to provide a simple, efficient, sensitive, economical and compact centrifugal governor in which a dual roller assembly is provided for reducing friction to an absolute minimum and which insures accuracy of performance without developing surging or hunting.

A further object consists in providing a centrifugal governor with a flyweight comprising two pairs of cylindrical rollers arranged in parallelism on opposite sides of the drive shaft and which are moved outwardly and radially therefrom under the influence of centrifugal force. The rollers of each pair are in contact with each other and also with opposed angular or inclined guide surfaces or spaced cam members so as to force these members apart by a wedging action. The cam members are urged toward each other by spring means or a force which at a predetermined speed balance the centrifugal force. Additionally, means are provided to insure the lines of contact between the rollers and the guide surfaces of the cam members being substantially in parallelism at all times.

A further object consists in mounting pairs of rollers between a fixed cam member and an axially displaceable cam member so that as the rollers are moved outwardly or inwardly, they roll on each other and are maintained in correct position by means which contact the rollers. Thus, the comparatively light pressure involved during acceleration and deacceleration results in extremely low friction with the result that the governor may be constructed and maintained efficiently in operation at a minimum cost of time and labor. Moreover, each pair of rollers is so mounted that they roll freely and are not dependent for their rolling action on such uncertain factors as relative frictional characteristics of various engaging surfaces.

Another object consists in the provision of positive means for maintaining the correct position of the rollers when displaced relative to the governor shaft under the action of centrifugal force and which includes associating with each pair of rollers members that contact the rollers and are so shaped as to translate the centrifugal force of the rollers into thrust, with an almost complete elimination of friction, due to the rolling action at all points of contact of the rollers and the members they engage.

Other objects and advantages of the invention will become apparent from the following description when taken in conjunction with the accompanying claims and drawings.

Referring to the drawing in which are shown for illustrative purposes, several preferred embodiments the invention may assume:

Figure 1:
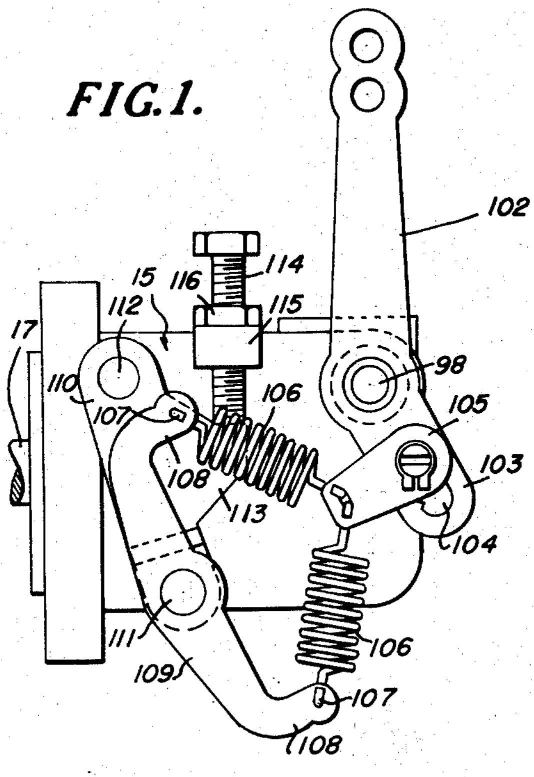
Figure 1 is a side view of variable speed centrifugal governor constructed in accordance with the present invention.
Figure 2:
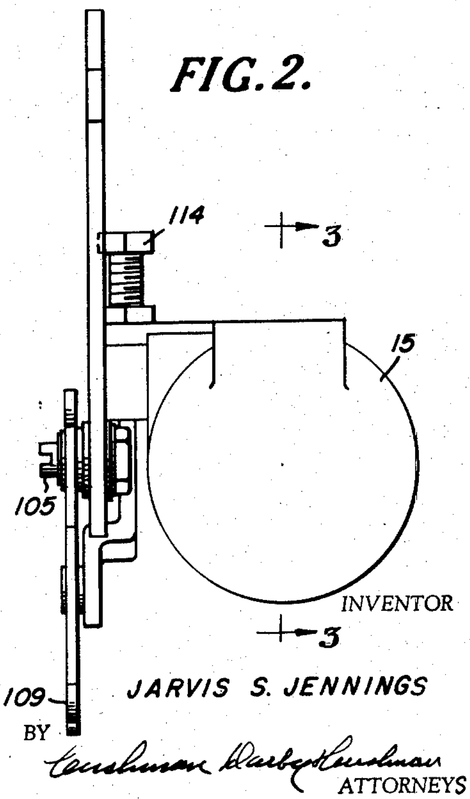
Figure 2 is an end view of Fig. 1.
Figure 3:
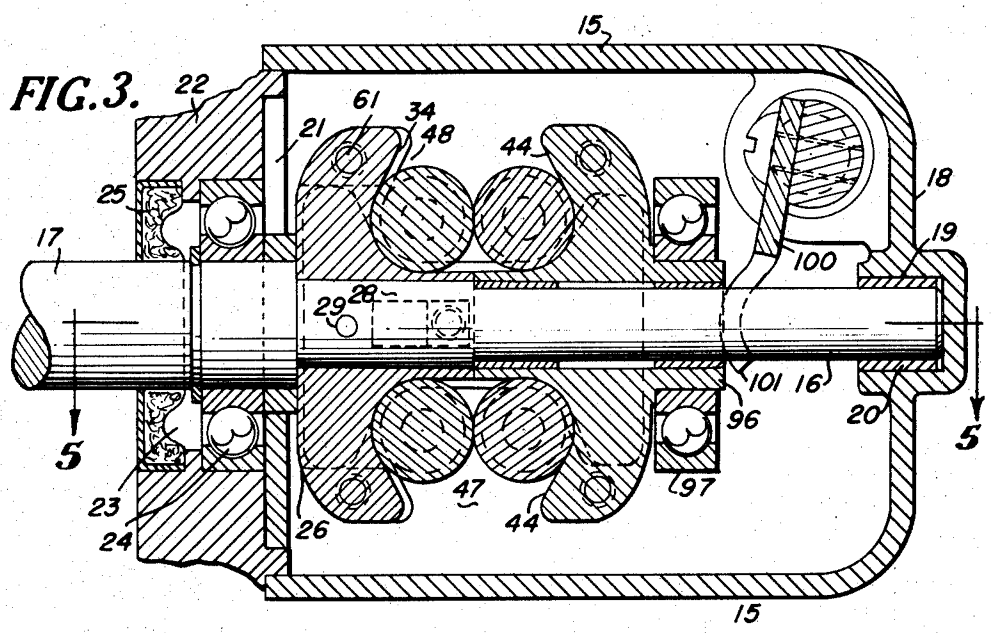
Figure 3 is a vertical sectional view taken substantially along the line 3—3 of Figure 2 showing the roller flyweights in their inner or open valve position.

Referring to the drawings, 15 designates the housing of a variable speed centrifugal governor (Fig. 1) into which extends the reduced end portion 16 of the governor shaft 17 (Fig. 3). The outer end 18 of the housing 15 has a central recess 19 into which is positioned a bearing sleve 20 for receiving the adjacent end of the shaft 16 so as to rotatably support the same. The housing is provided with an open end 21 (Fig. 3) which may be closed by a removable cap 22 having a central opening 23 that aligns with the recess 19 and through which extends the governor shaft 17. A ball bearing ring 24 is mounted in the wall of the opening 23 so as to engage the shaft 17. The opening 23 may also be provided with an oil seal 25.

In order to reduce friction to an absolute minimum, the governor is provided with flyweights in the form of two pairs of rollers 49 and 50 which are disposed between two yoke assemblies. Each yoke assembly includes a centrally located yoke member and a pair of cam plates, one at either side thereof. In the case of the first yoke assembly, the yoke member is designated by the reference numeral 26, and the two cam plates are designated by the reference numerals 56. In the case of the second yoke assembly, the yoke member is designated by the reference numeral 39, and the two cam plates are designated by the reference numerals 70. The yoke members of each yoke assembly will first be described, with particular reference to Figs. 6 and 7 which illustrate the configuration of yoke member 26, and Figs. 8 and 9 which illustrate the configuration of yoke member 39.

The yoke member 26 (Fig. 17) which is provided with a central inwardly extending portion or boss 27 having a central longitudinal opening 28 through which extends the reduced end portion 16 of the governor shaft 17. The yoke or member 26 is non-rotatably connected to the shaft 16 in any suitable manner such as by the threaded pins or bolts 29 that extend through threaded openings 30 (Fig. 17) in the outwardly extending guide lugs 31 on the sides of the yoke 26. The yoke has extending from opposite sides of the central reduced portion 27 the lateral arms 32 and 33 (Fig. 17), each of which has an inclined inner cam surface or face 34 that merges into a curve surface 35 which in turn connects with the flat outer surface 36 on the central portion 27. The opposite sides of the yoke member 26 are each formed with a smooth flat vertical surface 37 and the spaced shoulder portions 38.

The coacting movable yoke member 39 is axially slidable on the shaft 16 and is also formed with a central inwardly disposed portion 40 having an opening 41 which aligns with the opening 28 and through which extends the shaft 16. The yoke 39 on opposite sides of the shaft is formed with laterally extending arms 42 and 43 which project from opposite sides of the shaft 16. The arms 42 and 43 on their inner sides are formed with spaced downwardly inclined cam surfaces 44 which confront the inclined guide surfaces 34 on the fixed yoke 26. Each of the inclined surfaces 44 merges into a curved surface 45 which constitutes an extension of the flat side surface 46 of the central portion 40. Thus, it will be seen that the fixed yoke 26 and the yoke 39 are positioned on the shaft 16 so as to provide on opposite sides of the shaft, spaces or openings 47 and 48 in which are mounted pairs of contacting cylindrical rollers 49 and 50 that constitute the flyweights for forcing apart the yokes 26 and 39 when the shaft 17 is rotated and the rollers under the influence of centrifugal force are moved outwardly and radially relative to the shaft. Each of the rollers is provided with reduced end portions 52 that form the stop shoulders 53. The end portions 54 of the rollers may be tapered as at 55 and diverge inwardly so as to merge with the reduced end portions 52.

Figure 5:
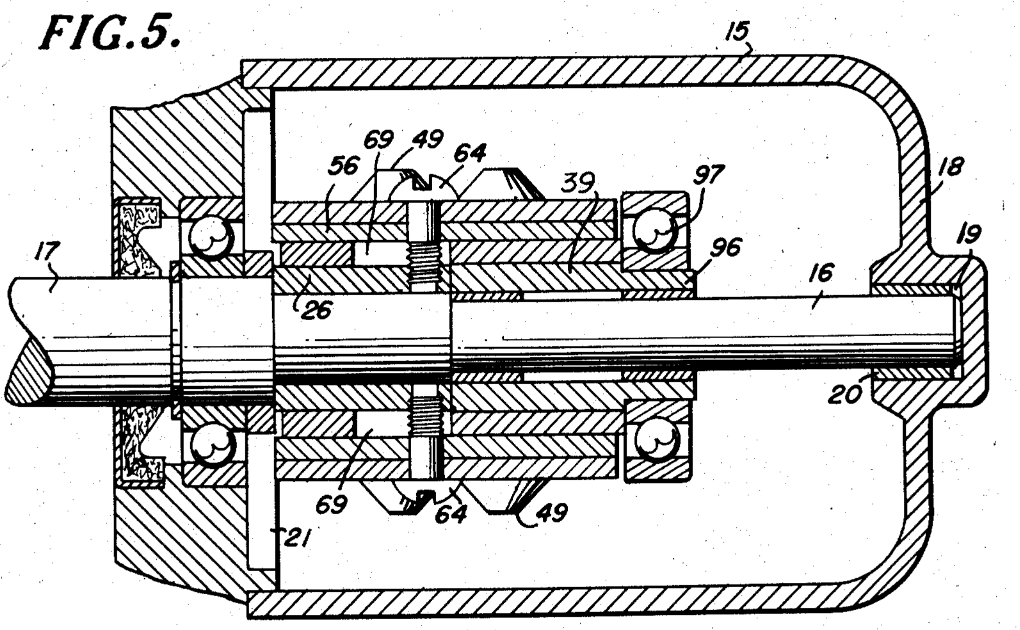
Figure 5 is a longitudinal sectional view taken substantially along the line 5—5 of Figure 3.
Figures 6, 7, 8, 9, 10, 11, 12, 13:
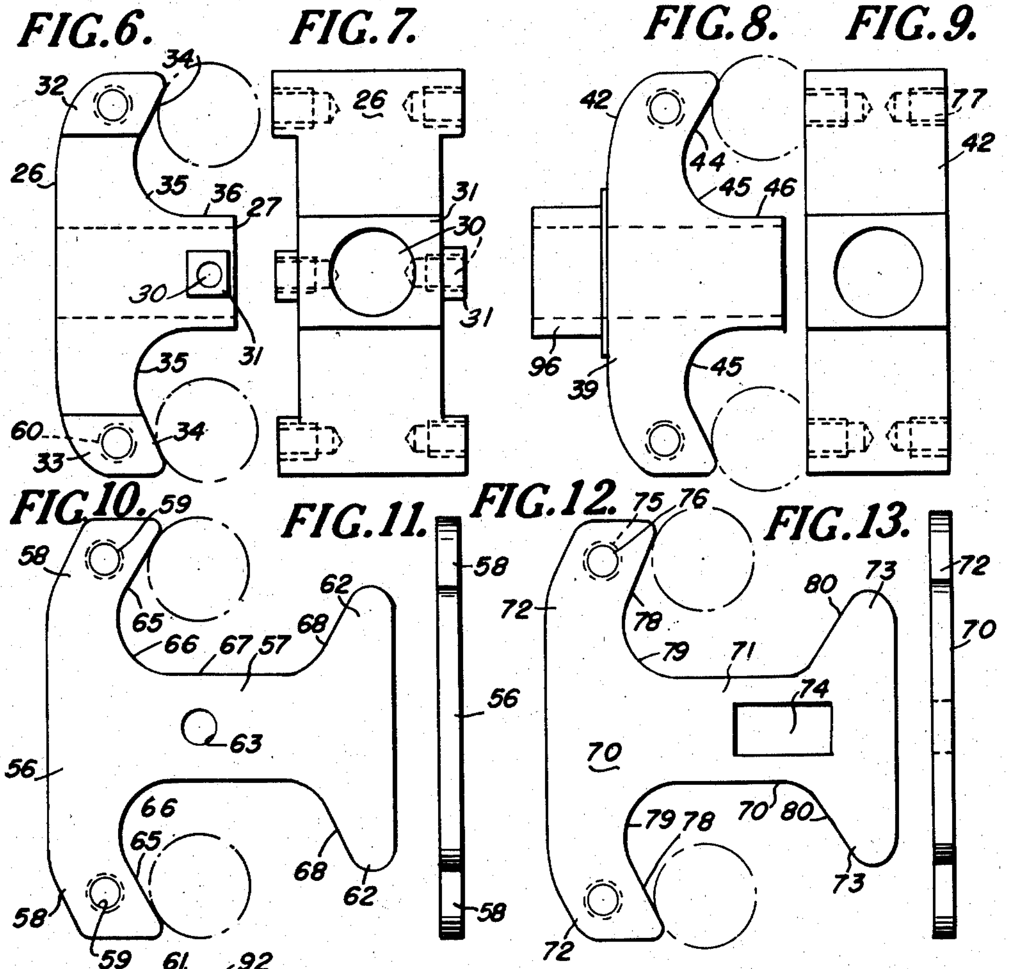
Figure 6 is a detailed side view of the fixed cam yoke member.
Figure 7 is an end view of Figure 6.
Figure 8 is a side view of the movable cam yoke member.
Figure 9 is an end view of Figure 8.
Figure 10 is a side view of one of the driving plates.
Figure 11 is an end view of Figure 10.
Figure 12 is a side view of one of the driven plates.
Figure 13 is an end view of Figure 12.
Figures 16, 17, 18:
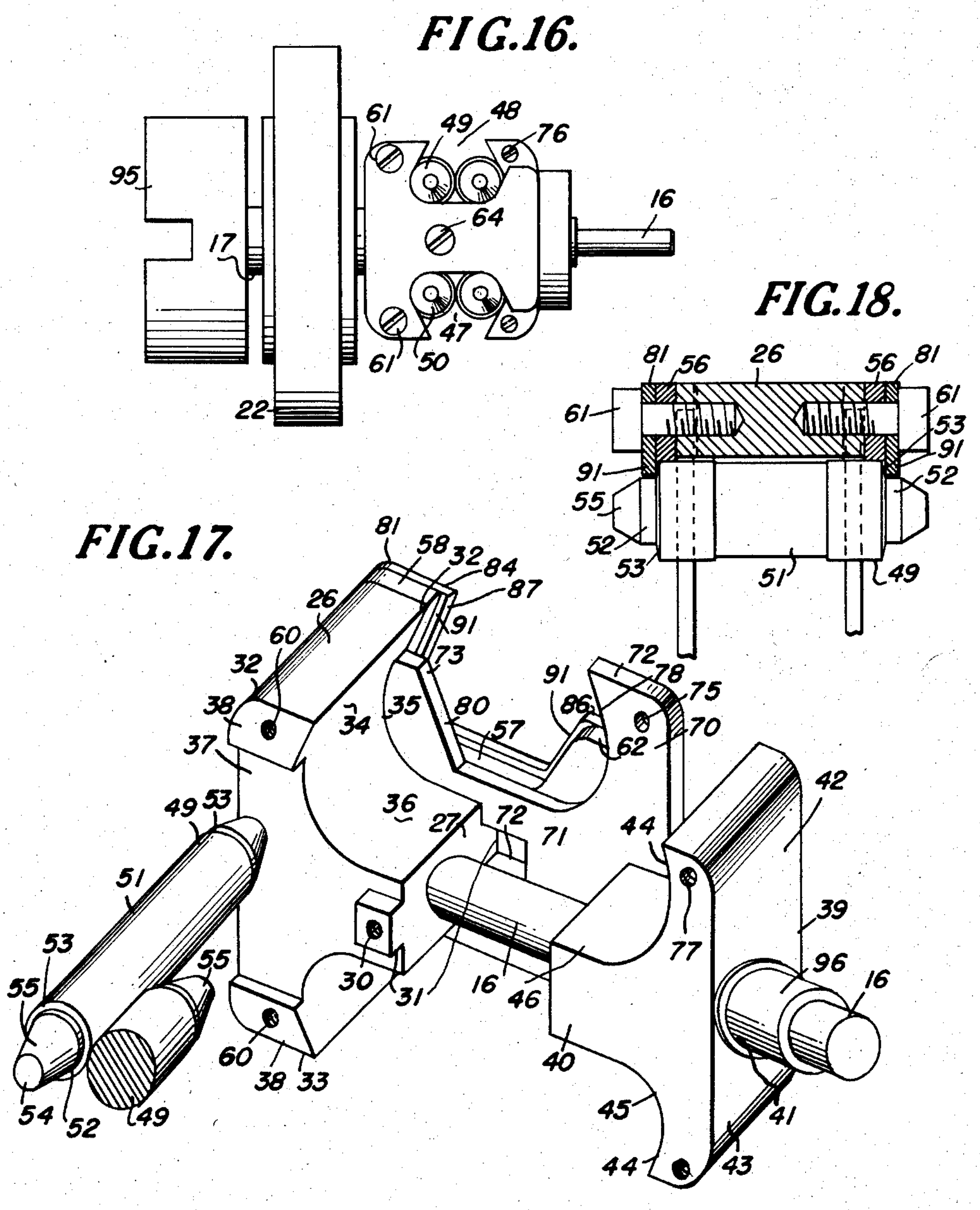
Figure 16 is a detailed side view of the governor assembly with the housing removed.
Figure 17 is a detailed perspective view, with parts disassembled, of the assembly.
Figure 18 is a detailed view with parts in section of one of the roller mountings.

To the opposite sides of the yoke or member 26 are connected the cam plates 56, each of which is formed with an intermediate reduced portion 57 (Fig. 10) that terminates at one end in the radially extending arms 58 of such length as to overlap the adjacent side of the member 26. The arms 58 are formed with spaced openings 59 which register with complementary threaded openings 60 in the shoulder portions 38 of the fixed yoke member 26 and are connected thereto by the threaded screws 61 (Fig. 16). The opposite end of the intermediate portion 57 terminates in the outwardly and radially extending arms 62 which overlap the sides of the movable yoke member 42. The intermediate portion 57 has an opening 63 through which extends a retaining bolt 64. The inner sides of the arms 58 are formed with angular or inclined cam surfaces 65 which merge into curved surfaces 66 that terminate in the straight sides 67 of the intermediate portion 57 so as to conform in configuration with the inner surfaces of the cam or member 26. The width of the arms 58 are the same as the width of the arms 32 and 33 (Fig. 17) and the inclined cam surface 65 as well as the curved surfaces 66 register with the surfaces 34 and 35 respectively so as to constitute a smooth guide bearing for the rollers. The arms 62 are provided on their inner sides with inclined guide surfaces 68 which diverge upwardly and outwardly from the intermediate portion 57 and overlap and are spaced from the adjacent sides of the movable cam or member 39. It will be noted that the arms 58 of the member 56 are spaced from the intermediate smooth portion 37 of the yoke 26 and engage the shoulder portions 38 thereof so as to provide spaces 69 (Fig. 5) between the sides of the yoke 26 and the plates 56 when the parts are assembled. A flat cam plate or member 70 substantially similar in shape to the plate 56, has an intermediate reduced elongated portion 71 provided at one end with the outwardly and laterally extending arms 72 and at its opposite end with the arms 73 of lesser length than the arm 72. Each of the intermediate portions 71 is provided with an elongated slot 74 arranged to slidably fit on the lug 31 so as to be longitudinally displaceable relative thereto. The arms 72 of the plate 70 are provided with openings 75 for receiving the threaded bolts 76 (Fig. 16) that engage the threaded opening 77 in the adjacent sides of the movable cam or member 39 so that the plate 70 is longitudinally or axially displaceable with the yoke 39. At the opposite end the plate 70 of the arm 73 loosely extends into the space 69 so as to be confined beneath the shoulders 38 on the fixed cam 26. The inner side of each of the arms 72 is provided with a downwardly inclined cam surface 78 which aligns with and is of the same pitch as the inner inclined surface 44 and 45 on the movable yoke 39. Each of the inclined surfaces 78 merges with a curved surface 79 which is connected to the straight adjacent side of the intermediate portion 71 (Fig. 12). Similarly, the arm 73 at the opposite end of the plate 71 has inclined guide surfaces 80 which normally overlap the adjacent sides 37, but do not protrude outwardly beyond the curved portions 35 of the fixed yoke 26. However, when the movable yoke 39 is displaced axially away from the fixed yoke 26, it causes the arms 73 to be moved to the position shown in Figure 4 and project beyond the curved portions 35 so as to constitute guide surfaces for the rollers as they are moved outwardly under the influence of centrifugal force due to the rotation of the shaft 17. Thus, it will be seen that each of the plates 56 is connected to the fixed yoke member 26 and is positioned outside of the adjacent movable plate 70 which is connected or fixed to the yoke 39 by the screws 76. The confronting inner faces of the yokes 26 and 39 as well as the opposed faces of the plates 56 and 70 constitute angular guide surfaces for each pair of contacting rollers 49 and 50.

Figures 14, 15:
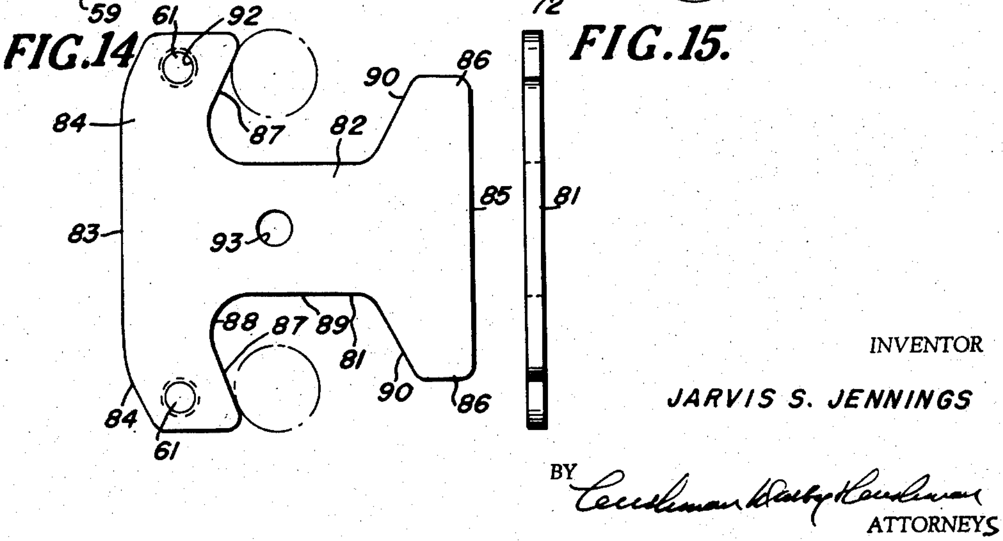
Figure 14 is a side view of a retaining plate.
Figure 15 is an end view of Figure 14.
Figure 19:
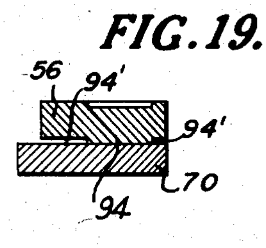
Figure 19 is a detailed transverse sectional view of a yoke member and its adjacent plate.

In order to prevent axial displacement of the rollers when mounted between the members 26 and 39, retaining plates 81 are provided which are substantially similar in configuration to the plates 56. Each of the retaining plates 81 includes an intermediate reduced flat portion 82 terminating at one end as at 83 in laterally disposed arms 84 and at ends opposite end 85 in the shorter arms 86 (Fig. 14). The width of the intermediate portion 82 as well as the ends 84 and 86 are slightly wider than their complementary portions on the plates 56 and 70 so as to provide the inner sides of the arms 84 with inclined guide surfaces 87 which are connected to curved surfaces 88 that in turn are connected to the straight side 89 of the intermediate portion 82. Likewise, the arms 86 have inclined sides 90 which merge into the straight sides 89, so as to provide a continuous flange 91 (Fig. 18) that projects beyond the adjacent side edges of the plate 56 in order to constitute space stops that are engaged by the shoulders 53 at the opposite ends of the rollers 49 and 50 in order to prevent the rollers from being removed laterally or axially from the assembly when the parts are set up. The arms 84 are provided with openings 92 through which extend the bolts 61 and the intermediate portion 82 of each of the retaining plates 81 has a central opening 93 for receiving the bolt 64 so as to firmly maintain the parts in a fixed position when assembled. Each of the plates 56 may be provided on its inner side with a flat lateral projection or boss 94 (Fig. 19) that engages the adjacent side of the movable plate 70, but without much pressure so as to form spaces 94' that tends to reduce the drag caused by the oil film that collects between the sliding member 70 especially when the governor is cold. As shown, the governor shaft 17 is rotatably connected at one end to a pulley 95 positioned outside of the cap 22, however, any other suitable means such as a gear mechanism or the like may be connected to the shaft 17 and a suitable drive means, for actuating the shaft 17.

Figure 4:
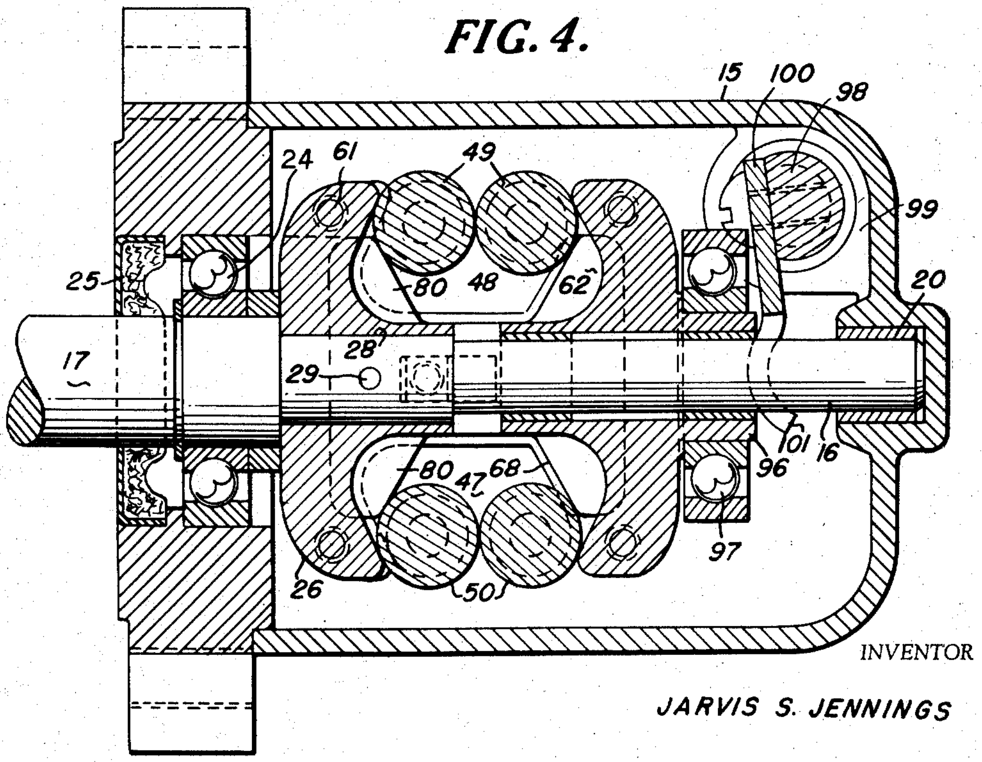
Figure 4 is a view similar to Figure 3 but showing the roller flyweights in their outer or closed valve position.

The movable cam 39 is provided with a hub 96 (Fig. 3) on which is mounted the thrust ball bearing 97. A transverse rocker shaft 98 is rotatably mounted in an upper corner of the housing 15 in any suitable manner, such as by the bearing 99 and has a lever or arm 100 extending downwardly therefrom. The lever 100 is provided with a bifurcated depending portion 101 the arms of which straddle the shaft 16 and contact the bearing 96 so that when the governor is moved from its open valve position, as shown in Figure 3, to its closed valve position, as shown in Figure 4, it will simultaneously cause the shaft 98 to be rotated counterclockwise and assume the position, as shown in Figure 4. The shaft 98 extends outwardly from one side of the housing 15 (Fig. 1) and has keyed or non-rotatably connected thereto an actuating lever 102 which in turn is operatively connected in any suitable manner (not shown) to the carburetor valve of the engine. The lever 102 has a depending offset portion 103 (Fig. 1) provided with an elongated slot 104 to which is connected a link 105 that in turn is connected to the diverging pair of coil springs 106 attached as at 107 to the spaced arms 108 of the yoke member 109. A spring adjusting lever 110 is connected at its lower end as at 111 to the intermediate portion of the yoke 109 and at its opposite end is connected as at 112 to the side of the housing 15. The lever 110 has a laterally extending shoulder or lug 113 which is engaged by an adjustable threaded bolt 114 that extends through a lug on the housing 15 and is maintained in a fixed adjusted position by a locking nut 116. Thus, it will be seen that the springs 106 provide resisting means which tends to normally rotate the shaft 98 so as to urge the lever 100 against the hub 96 so as to maintain the governor and its associated parts in the position shown in Figure 3, in which position the lever 102 is operatively connected to the carburetor valve to maintain it in its open position. As the speed of the shaft 17 increases, the contacting pairs of rollers 49 and 50 under the influence of centrifugal force, are moved outwardly and laterally to cause the yoke 39 to be moved away from the fixed yoke 26 to the position as shown in Figure 4. Simultaneously, with this movement, the shaft 98 is rotated against the resisting force of the spring 106 so as to move the actuating lever 102 to close the carburetor valve. It will be noted that each of the inclined inner surfaces 34 and 35 of the fixed cam yoke or member 26, as well as the sides 65 and 87 (Fig. 17), are inclined in a direction opposite to the adjacent surface 80 on the movable plate 70. Similarly, the inclined surfaces 44, 45, 78, and 90 are inclined in an opposite direction to the inclined surfaces 68 on the movable plate 56. Thus, the roller supporting members may be referred to as including guide surfaces disposed in adjacent pairs, one of which pair is movable relative to each other. Further, one surface of each pair, such as 34, is inclined in one direction and the other movable surface, such as 80, is inclined in an opposite direction so as to provide a locking angle for engaging each of the rollers and thus insure uniformity or equal movement of the rollers during the operation of the centrifugal governor.

By reason of the novel arrangement of parts, positive means are provided for preventing misalignment of the rollers. While the rollers may be in contact with their supporting members, they may be and preferably are spaced therefrom, as disclosed in Figure 18, which shows the rollers out of contact with their supports and engaging only the inclined guide plates.

Thus, it will be seen that a dual roller assembly is provided including two pairs of rollers 49 and 50 which are movable outwardly of the driving shaft under the influence of centrifugal force and which engage the angular faces of the yokes 26 and 39, respectively, and/or plates 56 and 70 that are yieldably urged toward each other by the springs 106 which at predetermined speed serve to balance the centrifugal forces. The lines of contact between the rollers and the angular or inclined faces of the yoke members and the plates are substantially always parallel assuming, of course, that the axis of the rollers are also parallel. In other words, each roller in any position of the assembly is located at an obtuse angle between the yoke members so that as the rollers move in and out, they freely roll upon each other and upon each of the guide cam surfaces, so as to be displaced while creating a minimum of friction between the engaging members or parts. Additionally, the flange portions 91 of the retainer plates provide means for maintaining the rollers in proper peripheral contact. The angle of the inclined guide surfaces 34 and 44 on the yoke members as well as the guide surfaces on the plates 56, 70, and 81, to a plane normal to the axis of the shaft 17, may vary in different designs. However, if the reactive force is to be as effective in moving the rollers toward shaft 17 upon a slight reduction in speed as is the centrifugal force in moving the rollers outwardly upon a slight increase in speed, the angle of each of the inclined guide surfaces should be that angle of which the tangent is .500. This angle is 26°, 33′, 54.06″, and for convenience may be considered as 26.5°. If such angle is chosen, then the thrust force along the axis 17 will be the same as the centrifugal force and will act through the same distance. If absolutely no friction were involved, a considerable departure from this angle could be made without affecting the efficient operation of the throttle valve of the engine. This angle may be varied as conditions require.

The hub 46 on the cam member 39 constitutes an extension which coacts with the extension or hub 36 on the fixed yoke member 26 to provide coacting guide surfaces which engage the rollers at points below the centers of the rollers to insure parallelism of the rollers and their equal distance from the drive shaft 17 being maintained in all positions they may assume. The tension of the springs 106 for various speeds is made by adjusting the screw 114 so that means are provided for accurately controlling the speed of the engine over a wide range of adjustment and which embodies a minimum of frictional load on the working parts of the governor, thus insuring a high degree of sensitivity and stability of performance under varying operating conditions and loads.

It will be noted that as the rollers move outwardly or inwardly they freely rotate on each other and on the guide surfaces so that friction due to the spring resistance is negligible. Moreover, the rollers cannot get out of position because of the provision of the stop flanges 91 (Fig. 18), which serve to maintain the rollers in proper position at all times. The ends 55 of the rollers are tapered in order that contact with the retainer plates 81 may be as nearly peripheral as possible. Thus, it will be seen that means are provided in which comparatively light pressure is applied during acceleration and deacceleration, which results in extremely low friction being developed at the points of contact with the roller guide surfaces. Moreover, this arrangement provides means for preventing surging or instability with the result that the governor can be installed and efficiently maintained at comparatively low cost. The dual roller assembly insures the rollers when displaced laterally, from rolling out of contact with each other. Moreover, this rolling action is not dependent on such uncertain factors as relative friction characteristics of various engaging surfaces which frequently detracts from the otherwise efficient operation of the governor.

Figure 20:
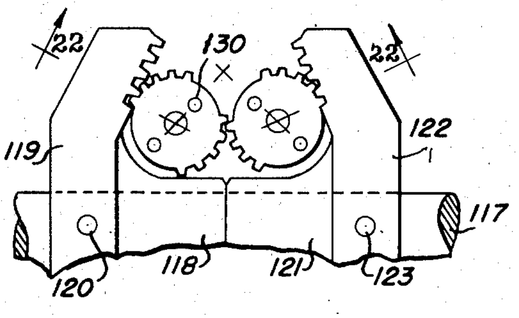
Figure 20 is a side elevational view of a modified form of roller assembly.
Figure 21:
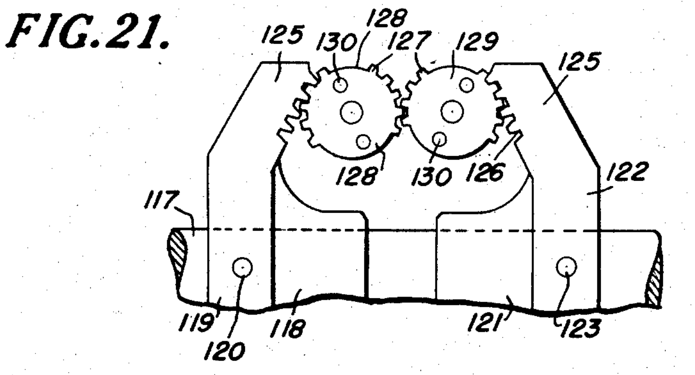
Figure 21 is a view similar to Figure 20 with the rollers in their extended position.
Figure 22:
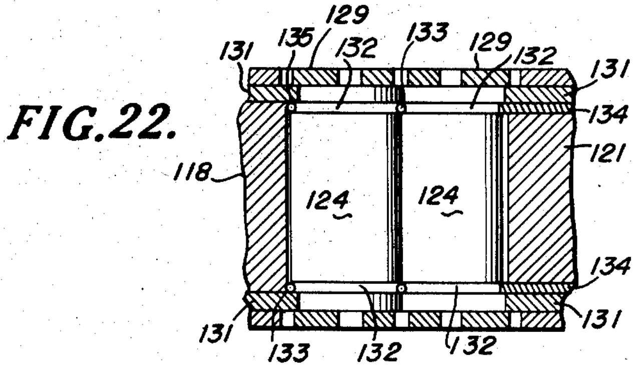
Figure 22 is a sectional view taken substantially along the line 22—22 of Figure 20.

Figures 20, 21, and 22 show modified forms of means for maintaining the correct position of the rollers, and includes a governor drive shaft 117 on which is fixed a driving yoke 118 that has connected thereto a rack bar 119 by the bolts or screws 120. Longitudinally or axially slidable on the shaft 117 is a driven yoke 121 to which is fixed a rack bar 122 by the bolts 123. Between the spaced rack bars 119 and 122 on opposite sides of the shaft 117 are pairs of contacting rollers 124. The rack bars 119 and 122 are provided with spaced inwardly inclined arms 125 at the ends thereof which have their inner surfaces provided with teeth 126 arranged to mesh with complementary formed teeth or gears 127 which as shown, are circumferentially spaced on the ends of the rollers so as to provide interrupted portions 128. However, the teeth 127 may extend continuously around the rollers and preferably are formed on the periphery of circular plates 129, connected by the pins or bolts 130, to the adjacent ends of each of the rollers 124 so that the gears on the rollers mesh with each other and also with the adjacent rack bars 125 to maintain the rollers at equal distances from the shaft 117. Cam plates 131 (Fig. 22) may be fastened by the bolts 120 and 123 to the ends of the driving and driven yokes 118 and 121. The pitch diameter of the gears 127 is the same as the diameter of the rollers 124 and the pitch lines of the arms 125 of the rack bar are in the same plane as the roller engaging surfaces of the cam plates, 131. Thus, it will be seen that the gears 127 mesh with the teeth in the racks 126 and with the gears in adjacent rollers so as to cause the simultaneous movement of the rollers smoothly and with friction reduced to a minimum. The rollers 124 adjacent the ends thereof are provided with circumferentially disposed grooves 132 for receiving snap rings 133 which are carried by the rollers 124 adjacent the driving yoke 118 (Fig. 22) and which fit in the adjacent aligned grooves of the roller in the driven yoke 121 so as to maintain the rollers in proper position. Roller guide plates 134 are positioned between the ends of the driven yoke 121 and their associated cam plates 131 and may be fastened to the yoke 121 by the bolts or pins 123. The depth of each of the grooves 132 is about ½ the sectional diameter of the snap rings 133, so that the protruding portion of each of the snap rings engages the inside edge of the adjacent cam plate 131 as at 135 (Fig. 22). Thus, it will be seen that the guide plates 134 which extend into the adjacent grooves 132 coact with the snap rings 133 to maintain the rollers in proper operative position.

Figures 23, 24:
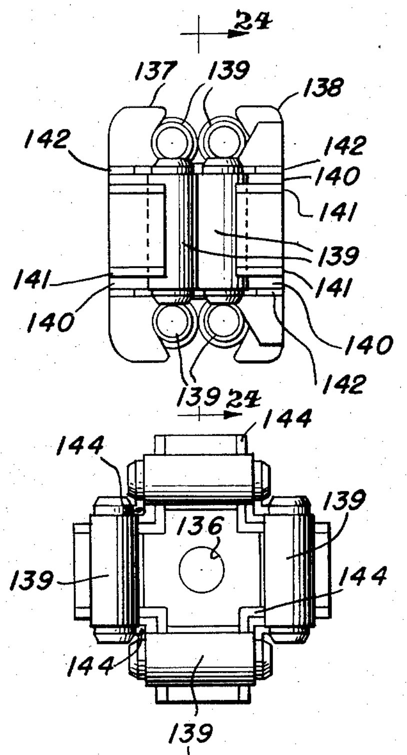
Figure 23 is a sectional view taken substantially along the line 23—23 of Figure 24, showing a further modification.
Figure 24 is an end view of Figure 23, showing the rollers or weights in their closed position.
Figure 25:
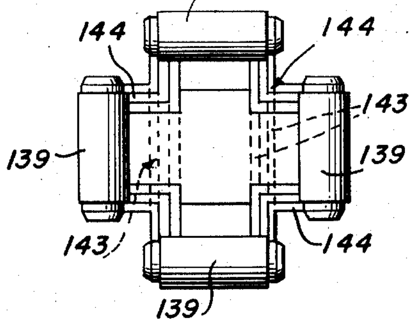
Figure 25 is a view similar to Figure 24, showing the rollers in their opened or extended position.

In the modified form of the invention shown in Figures 23, 24, and 25, four pairs of rollers are provided for the purpose of adding weight for extra force or power. Manifestly, any number of pairs of rollers may be used, provided, they are arranged in groups of two. The governor assembly in this form is substantially similar to that shown in the forms previously described with the exception that the governor housing 15 (Fig. 3) has mounted therein a governor shaft 136 (Fig. 24) with which is associated guide plates 137 and 138 substantially similar to the cam yokes 26, previously described, and between which are disposed pairs of rollers 139. Guide plates 140 similar to the plates 56, and plates 141 similar to the plates 70, and plates 142 similar to the plates 81, are also provided for controlling the operation of the rollers 139 under the action of centrifugal force, when the governor shaft 136 is rotated. In other words, in this form, the governor is provided with four straight roller guide plates 143 shown in dotted lines in Figure 25 and eight substantially L-shaped guide plates 144 having their arms extending substantially at right angles (Fig. 24). Thus, it will be seen that the only difference between the governor in this form and those previously described, is that in the four pairs of roller flyweights, there are provided roller plate guides 144 that are bent at 90° and also roller plate guides 143 that are straight, while in the form of governor using two pairs of roller flyweights (Fig. 3) only straight guides are provided. It will be manifest that the weight of the rollers may be reduced by making the rollers hollow which is particularly desirable in high speed operation.

It will be noted that in all forms of the invention pairs of rollers coact with roller engaging members so as to translate the centrifugal force of the rollers into thrust, with an almost complete elimination of friction, because of the rolling action at all points of contact of the rollers with each other and the members they engage.

It will be understood that the forms of the invention shown are merely illustrative of preferred embodiments and that such changes may be made as come within the scope of the following claims.

I claim:

1. In a centrifugal governor having in combination, a housing, a governor shaft rotatably mounted in the housing, a yoke having a central tubular portion fixed to said shaft, said yoke having radial arms extending in opposite directions from said tubular portion, a movable yoke having a central tubular portion axially slidable on said shaft, said movable yoke having radial arms extending in opposite directions from said shaft and spaced from the arms on said fixed yoke, cam plates on opposite sides of said fixed yoke, means connecting the cam plates to said fixed yoke, each of said cam plates having an axial extension terminating in radial arms, movable cam plates positioned on opposite sides of said movable yoke, means connecting said movable cam plates to said movable yoke, said fixed yoke having recesses in the sides thereof for loosely receiving said movable cam plates, each of said movable cam plates having a central extension terminating in radial arms, the extension on said yokes overlapping the extensions on said cam plates, retainer plates overlapping said cam plates and connected to said fixed yoke, each of said retainer plates having an intermediate reduced portion terminating in radial arms to overlap the movable cam plates, the opposed surfaces of the yokes and said plates having inclined sides extending in opposite directions, rollers between said yokes and arranged in pairs on opposite sides of said shaft, each pair of rollers tangentially engaging each other and adjacent inclined sides on the yokes and said plates, and means for maintaining the rollers between said yokes.

2. In a centrifugal governor having in combination, a housing, a governor shaft rotatably mounted in the housing, a yoke having a central tubular portion fixed to said shaft, said yoke having radial arms extending in opposite directions from said tubular portion, a movable yoke having a central tubular portion axially slidable on said shaft, said movable yoke having radial arms extending in opposite directions from said shaft and spaced from the arms on said fixed yoke, cam plates on opposite sides of said fixed yoke, means connecting the cam plates to said fixed yoke, each of said cam plates having an axial extension terminating in radial arms, movable cam plates positioned on opposite sides of said movable yoke, means connecting said movable cam plates to said movable yoke, said fixed yoke having recesses in the sides thereof for loosely receiving said movable cam plates, each of said movable cam plates having a central extension terminating in radial arms, the extension on said yokes overlapping the extensions on said cam plates, retainer plates overlapping said cam plates and connected to said fixed yoke, each of said retainer plates having an intermediate reduced portion terminating in radial arms to overlap the movable cam plates, the opposed surfaces of the yokes and said plates having inclined sides extending in opposite directions, rollers between said yokes and arranged in pairs on opposite sides of said shaft, each pair of rollers engaging adjacent inclined sides on the yokes and said plates, said retaining plates being provided with means for limiting axial movement of the rollers, said rollers being movable outwardly and radially relative to the governor shaft under the influence of centrifugal force so as to displace the movable yoke and movable cam members axially relative to the fixed yoke, and means for yieldably urging the yoke members towards each other.

3. In a centrifugal governor as called for in claim 1 in which the rollers are provided with reduced shoulder portions adjacent the ends thereof and the arms of the retainer plates project outwardly beyond the arms of the cam plate so as to engage the shoulder portions of the rollers in order to limit their axial movement.

4. In a centrifugal governor of the class described, a housing, a governor shaft rotatably mounted in the housing, a yoke fixed to said shaft, a coacting movable yoke axially slidable on said shaft and spaced from said fixed yoke, each of said yokes having extending transversely thereof spaced rack bars, having end portions inclined inwardly towards each other and provided with teeth on their inner opposed sides, rollers between said yokes and arranged in pairs on opposite sides of said shaft, and gears connected to the ends of said rollers and meshing with the teeth on said rack bars to provide means for maintaining the correct position of the rollers when moved relative to the governor shaft.

5. In a roller type governor having a rotatable spindle the combination of two oppositely disposed and relatively movable yoke assemblies, each yoke assembly comprising a central yoke member and two cam plates affixed to the side surfaces thereof, each yoke member providing a cam surface and said cam plates providing guide surfaces, a pair of rollers disposed between said cam surfaces, the cylindrical surfaces of said rollers being in contact with each other, and the same cylindrical surface of each roller being in contact with one of said cam surfaces said cam and guide surfaces being parallel to each other and spaced from each other in a direction parallel to the axis of the spindle by a distance somewhat less than the sum of the diameters of the two rollers, said yoke assemblies being arranged in interleaved relationship with each other, and one being affixed to said spindle and the other being slidably mounted on said spindle, whereby each roller will be engaged by the cam surface of one yoke member and by the guide surfaces of the cam plates associated with the other yoke member.

6. A roller governor comprising a rotatably mounted shaft, first and second yoke members secured to said shaft in non-rotatable relationship thereto, one of said yoke members being axially displaceable with respect to the other, and each yoke member having a cam surface which is inclined to the axis of said shaft, said cam surfaces being oppositely disposed and facing each other, a pair of rollers disposed between said cam surfaces, and being in peripheral contact with each other, and each roller being in peripheral contact with one of said cam surfaces, a first cam plate secured to said first yoke member and having a guide surface substantially parallel to said first yoke cam surface but axially spaced therefrom and overlapping the cam surface of said second yoke member so that the surfaces of said first yoke guide surface and said second yoke cam surface provide a locking angle for that roller which is adjacent to said second yoke member, and a second cam plate secured to said second yoke member and having a guide surface substantially parallel to said second yoke cam surface but axially spaced therefrom and overlapping the cam surface of said first yoke member so that the surfaces of said second yoke guide surface and said first yoke cam surface provide a locking angle for that roller which is adjacent to said first yoke member, whereby each roller may be held in engagement with the other by means of said locking angles, and so that the axes of said rollers will be maintained in a common plane irrespective of the radial displacement of said rollers and consequent axial displacement of one of said yoke members, said locking angles providing points of rolling contact between each roller and its associated cam and guide surfaces, and the point of engagement of each roller with the other providing a point of rolling contact, all of said points of rolling contact for each roller lying on the same cylindrical roller surface whereby there will be no sliding contact at said points of rolling contact.

7. A roller governor comprising a rotatably mounted shaft, first and second yoke members mounted on said shaft for rotation therewith, one of said yoke members being axially displaceable with respect to the other, and each yoke member having a cam surface which is inclined to the axis of said shaft, said cam surfaces being oppositely disposed and facing each other, a pair of rollers disposed between said cam surfaces, and being in peripheral contact with each other, and each roller being in peripheral contact with one of said yoke surfaces, a first cam plate secured to said first yoke member and having a guide surface substantially parallel to said first yoke cam surface but axially spaced therefrom and being disposed adjacent said second yoke member so that said first yoke guide surface and said second yoke cam surface cooperate to provide a locking angle for that roller which is adjacent to said second yoke member, and a second cam plate secured to said second yoke member and having a guide surface substantially parallel to said second yoke cam surface but axially spaced therefrom and being disposed adjacent said first yoke member so that said second yoke guide surface and said first yoke cam surface cooperate to provide a locking angle for that roller which is adjacent to said first yoke member, whereby the distance between the vertices of said locking angles remains constant irrespective of the radial displacement of said rollers and subsequent axial displacement of one of said yoke members, said locking angles providing points of rolling contact between each roller and its associated cam and guide surfaces, and the point of engagement of each roller with the other providing a point of rolling contact, all of said points of rolling contact for each roller lying on the same cylindrical roller surface whereby there will be no sliding contact at said points of rolling contact.

References Cited in the file of this patent

UNITED STATES PATENTS

| | | |
|---|---|---|
| 957,898 | Olivier | May 17, 1910 |
| 2,146,046 | Bancroft | Feb. 7, 1939 |

FOREIGN PATENTS

| | | |
|---|---|---|
| 163,713 | Germany | Oct. 23, 1905 |
| 823,365 | Germany | Dec. 3, 1951 |
| 19,299 | Great Britain | Aug. 29, 1911 |